UNITED STATES PATENT OFFICE.

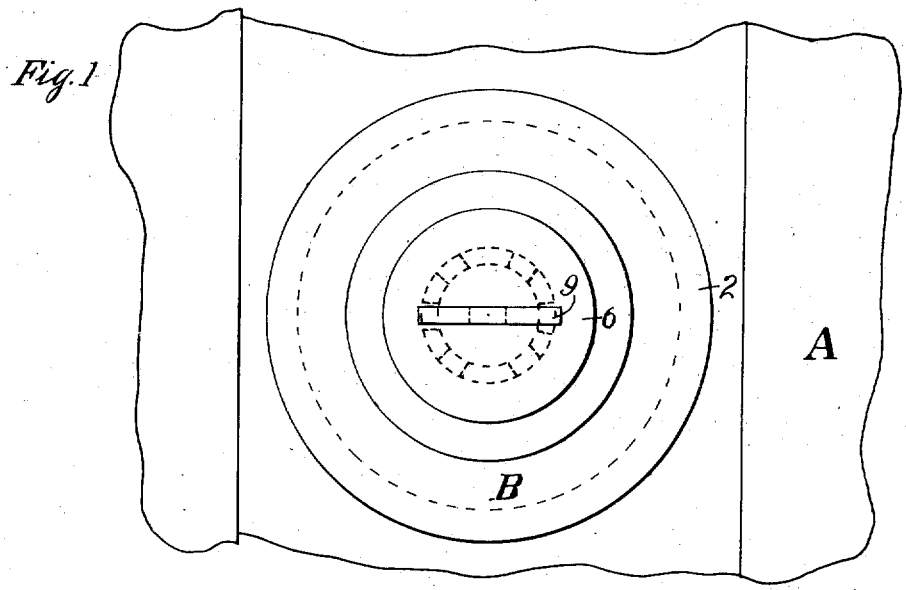
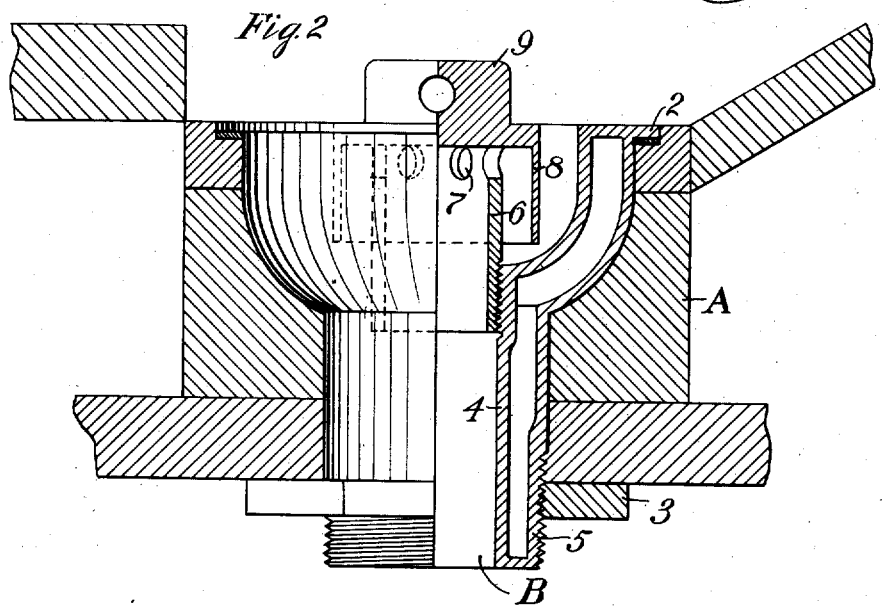

GEBHARD C. BOHN, OF ST. PAUL, MINNESOTA.

REFRIGERATOR-TRAP.

989,559.      Specification of Letters Patent.      Patented Apr. 18, 1911.

Application filed December 22, 1906. Serial No. 349,053.

*To all whom it may concern:*

Be it known that I, GEBHARD C. BOHN, a citizen of the United States, residing at St. Paul, in the county of Ramsey and State of Minnesota, have invented certain new and useful Improvements in Refrigerator-Traps, of which the following is a specification.

My invention relates to improvements in refrigerator traps, its object being particularly to provide an improved form of drip trap which will effectively drain the refrigerator and which will be insulated from the surrounding woodwork so as to prevent rotting thereof.

In the accompanying drawings forming part of this specification, Figure 1 is a top view of my improved trap, and Fig. 2 is a vertical section of the same and surrounding framework.

In the drawings A represents the floor of the refrigerator and B the trap which is inset in an opening through the floor. The trap is held in position by a flange 2 which fits in a corresponding opening in the inner face of the floor and by means of a nut 3 which is threaded upon the lower end of the trap and bears against the under face of the floor. As shown in Fig. 2 the trap is formed with inner and outer parallel walls 4 and 5 forming an intermediate dead air space. The upper end of the trap flares outwardly, as shown. Threaded in the upper end of the inner wall 4 is a cap 6 formed in the upper portion of its side wall with openings 7 and with an outwardly and downwardly extending hood portion 8 which stands within the cupped top of the trap, as shown in Fig. 2. Thus in use the water passes downward between the hood 8 and the adjacent wall 4 of the trap, and through the opening 7 and the central discharge opening of the trap. As will be seen the flared top of the trap constitutes a well surrounding the cap into which well heavier matter can accumulate allowing the water to pass off through the opening 7. The cap is provided with a nut 9 to which a wrench may be applied to remove it from the trap for cleaning purposes.

A particular feature of my invention is the double wall construction 4 and 5 which forms an intermediate dead air space. This insulates the outer wall 5 against sweating. This sweating in the ordinary single wall construction of traps rots the surrounding woodwork. I also procure a trap which is particularly easy of removal.

I claim—

1. A trap for refrigerators comprising a conduit formed with inner and outer walls spaced from each other and connected at their ends to provide an intermediate air chamber, and a cap adjustably supported within the inner wall of said conduit and formed with port openings.

2. A trap for refrigerators, comprising a conduit formed of inner and outer walls spaced from each other and connected at their ends to provide an intermediate air chamber, the upper portion of said conduit being flared, and a cap arranged in the flared end of said conduit and adjustably connected to the latter, said cap having a series of ports and a depending hood covering said ports.

3. In combination with a refrigerator floor, a trap therefor provided with parallel inner and outer side walls connected at top and bottom to constitute a central conduit and a surrounding dead air chamber, said walls being outwardly flared at their outer ends, and a cap removably secured in the upper end of said conduit below said flared portion, said cap being formed with ports.

4. In combination with a refrigerator floor, a trap removably secured therein, said trap being formed with interspaced side walls constituting an intermediate dead air space and a central conduit, a cap removably secured in the upper end of said conduit, and being formed with ports, and a hood carried by said cap, said hood extending downwardly below said ports.

In testimony whereof I affix my signature in presence of two witnesses.

GEBHARD C. BOHN.

Witnesses:
    H. S. JOHNSON,
    HATTIE SMITH.